United States Patent
Castrale et al.

(10) Patent No.: US 7,930,800 B1
(45) Date of Patent: Apr. 26, 2011

(54) GROMMET APPARATUS

(76) Inventors: Samual P. Castrale, Port Arthur, TX (US); Patricia Castrale, Port Arthur, TX (US)

( * ) Notice: Subject to any disclaimer, the term of this patent is extended or adjusted under 35 U.S.C. 154(b) by 311 days.

(21) Appl. No.: 12/206,453

(22) Filed: Sep. 8, 2008

(51) Int. Cl.
*F16L 5/02* (2006.01)
*H01B 17/58* (2006.01)

(52) U.S. Cl. .......................... 16/2.2; 174/153 G
(58) Field of Classification Search .......... 16/2.1, 16/2.2, 2.5; 52/220.8; 138/110, 170, 178; 248/56, 231.9; 24/136 L, 713.6; 217/98, 217/113, 106; 174/152 R, 153 G, 154, 152 G
See application file for complete search history.

(56) References Cited

U.S. PATENT DOCUMENTS

| | | | |
|---|---|---|---|
| 3,577,115 A | 5/1971 | Whitright | |
| 3,811,004 A | 5/1974 | Moore | |
| 4,860,791 A * | 8/1989 | Putnam | 137/565.01 |
| D364,849 S | 12/1995 | De Waal | |
| 5,488,198 A * | 1/1996 | Kramer | 174/507 |
| 5,567,916 A * | 10/1996 | Napiorkowski et al. | 174/153 G |
| 6,147,307 A * | 11/2000 | Ling et al. | 174/659 |
| 6,376,777 B1 * | 4/2002 | Ito et al. | 174/152 G |
| 6,685,502 B2 | 2/2004 | Wheeler | |
| 6,730,853 B1 | 5/2004 | Baker | |
| 6,971,883 B1 | 12/2005 | Ridge | |
| 7,017,310 B2 * | 3/2006 | Brunt | 52/220.1 |
| 7,049,515 B1 * | 5/2006 | Collins et al. | 174/668 |
| 7,355,130 B2 * | 4/2008 | Holman et al. | 174/658 |
| 7,388,165 B1 * | 6/2008 | Mahoney | 174/650 |

* cited by examiner

*Primary Examiner* — Chuck Y. Mah
(74) *Attorney, Agent, or Firm* — Crossley Patent Law; Mark A. Crossley

(57) ABSTRACT

The flange apparatus provides a positive seal for an appliance tube which enters a junction box of a travel trailer, motor home, or the like. The union of the apparatus is fitted coplanarly to the exterior wall of the junction box. The first and second segment overlap the opening in the junction box, further ensuring a complete seal. The second flat bottom of the second segment abuts the frame of the box exterior wall, further ensuring a complete seal. The orifice of the apparatus is provided in more than one size. Each size of the apparatus orifice conforms to a particular appliance tube size, further ensuring a complete seal per application. The slot of the apparatus aids in insertion of the apparatus into the exterior wall and in the insertion of the tube into the apparatus, then collapses upon itself to fully seal.

1 Claim, 4 Drawing Sheets

GROMMET APPARATUS

BACKGROUND OF THE INVENTION

Appliance access means exist in travel trailers and motor homes. The access boxes and panels referred to typically comprise an arched elongated hole where various electrical cables and hoses enter the vehicle. These cables and hoses typically enter via what can be termed an appliance tube. These access means allow invasion by rodents, insects, arachnids, water, and air, none of which are desirable. Associated problems of inconvenience, destruction, electrical shorts, and energy losses occur. Some such problems can be costly, not to mention the aggravation. While some previous solutions have been proposed, none provides an effective and complete seal against the above listed invaders. The present apparatus provides a complete and effective seal around an appliance tube which enters electrical and fluid tube access to travel trailers and mobile homes.

FIELD OF THE INVENTION

The flange apparatus relates to appliance access doors of travel trailers, motor homes and the like and more especially to a flange apparatus which provides a seal for the appliance tube entry into the access doors, which prohibits the passage of air, weather elements, bugs, and rodents.

SUMMARY OF THE INVENTION

The general purpose of the flange apparatus, described subsequently in greater detail, is to provide a flange apparatus which has many novel features that result in an improved flange apparatus which is not anticipated, rendered obvious, suggested, or even implied by prior art, either alone or in combination thereof.

To attain this, the flange apparatus provides a positive seal for an appliance tube which enters a junction box of a travel trailer, motor home, or the like. The union of the apparatus is fitted coplanarly to the exterior wall of the junction box. The first and second segment overlap the opening in the junction box, further ensuring a complete seal. The second flat bottom of the second segment abuts the frame of the box exterior wall, further ensuring a complete seal. The orifice of the apparatus is provided in more than one size. Each size of the apparatus orifice conforms to a particular appliance tube size, further ensuring a complete seal per application. The slot of the apparatus aids in insertion into the exterior wall, then collapses upon itself to fully seal.

Thus has been broadly outlined the more important features of the improved flange apparatus so that the detailed description thereof that follows may be better understood and in order that the present contribution to the art may be better appreciated.

An object of the flange apparatus is to seal the appliance tube access and tube for travel trailers, motor homes and the like.

Another object of the flange apparatus is to prevent entry of rodents, bugs, air, and water.

A further object of the flange apparatus is to seal completely around the appliance tube.

An added object of the flange apparatus is to overlap on both sides of the exterior wall of a junction box.

And, an object of the flange apparatus is to abut the exterior frame of the junction box.

These together with additional objects, features and advantages of the improved flange apparatus will be readily apparent to those of ordinary skill in the art upon reading the following detailed description of presently preferred, but nonetheless illustrative, embodiments of the improved flange apparatus when taken in conjunction with the accompanying drawings.

In this respect, before explaining the current embodiments of the improved flange apparatus in detail, it is to be understood that the flange apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved flange apparatus. It is therefore important that the claims be regarded as including such equivalent constructions insofar as they do not depart from the spirit and scope of the flange apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the flange apparatus generally designated by the reference number 10 will be described.

Figure 1:
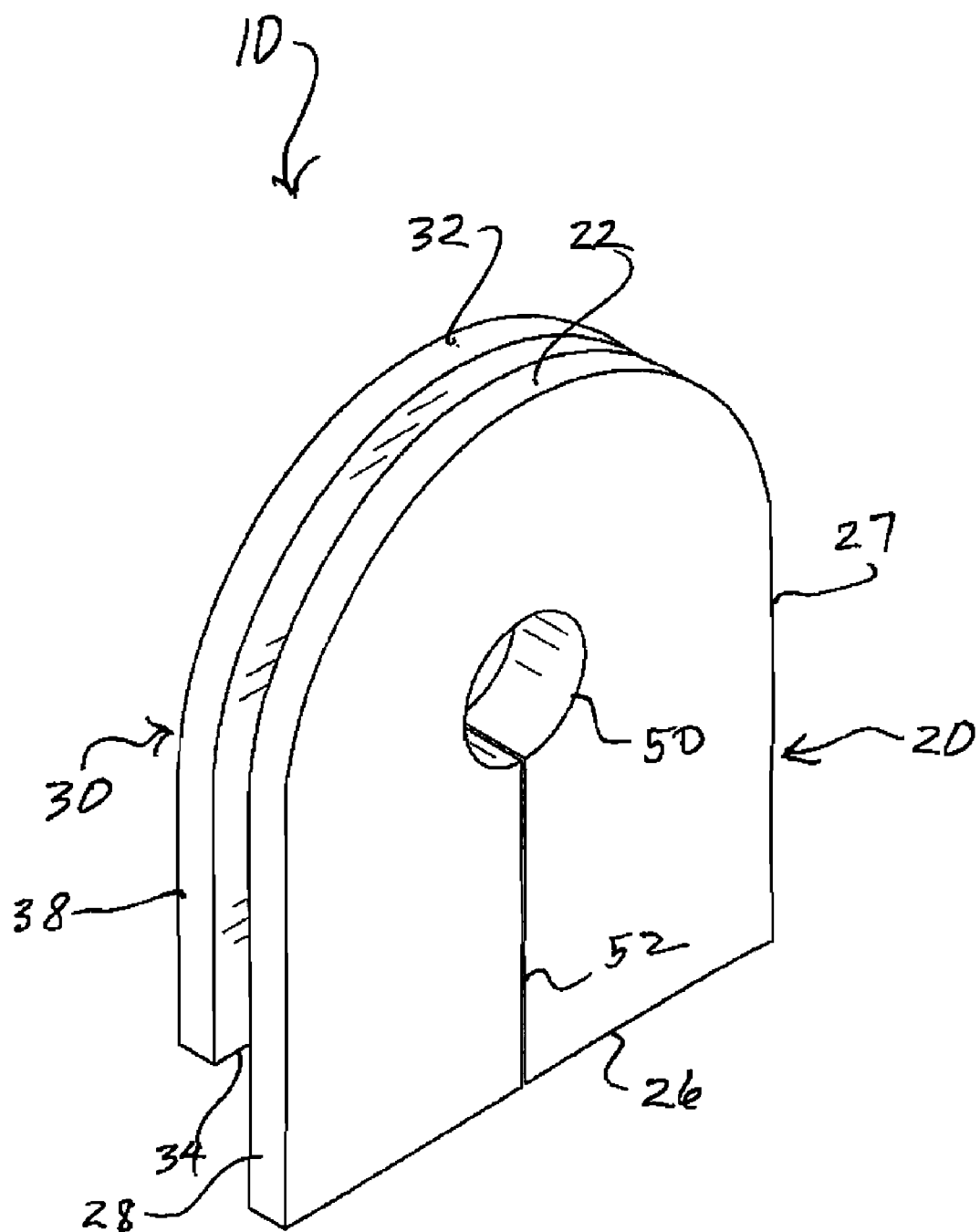
FIG. 1 is a perspective view.
Figure 4:
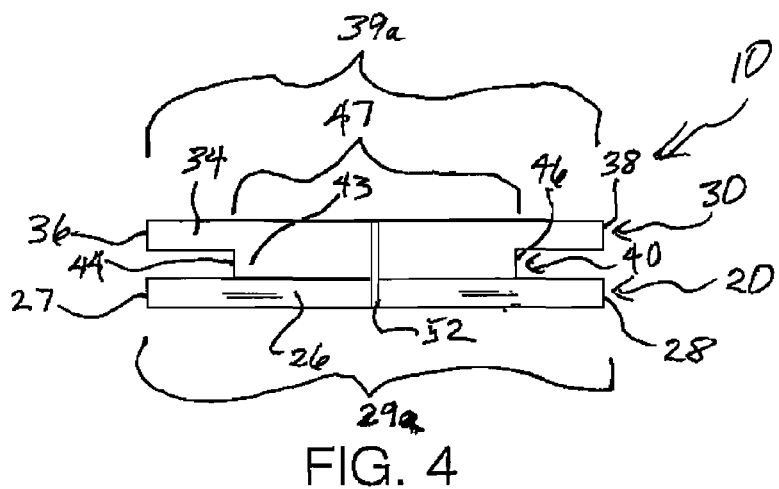
FIG. 4 is a bottom plan view.
Figure 6:
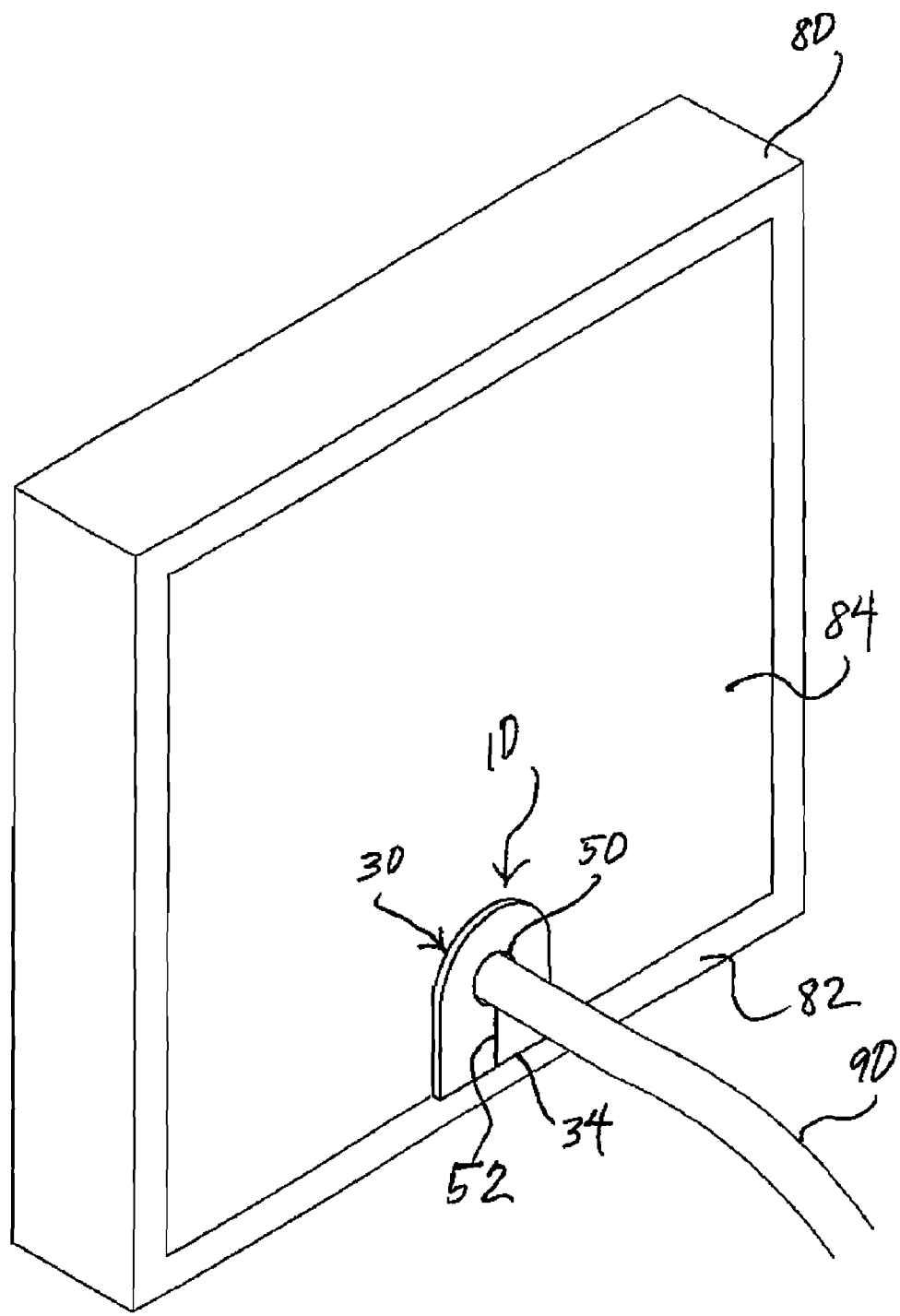
FIG. 6 is a perspective view of the apparatus installed.

Referring to FIGS. 1, 4, and 6, the flange apparatus 10 is selectively fitted to an opening (not shown) of a junction box 80 of a trailer, motor home or the like. The orifice 50 of the apparatus 10 is through about a center of the first segment 20, the union 40, and the second segment 30. The orifice 50 is in selective receipt of an appliance tube 90 of the trailer or motor home junction box 80. The orifice 50 completely surrounds and seals the tube 90. The slot 52 aids in installation of the apparatus 10 by providing a measure of forgiveness in fitting the apparatus 10 to the junction box 80 and around the tube 90. The second flat bottom 34 of the second segment 30 fits snugly against the frame 82 of the junction box 80.

Figures 2, 3:
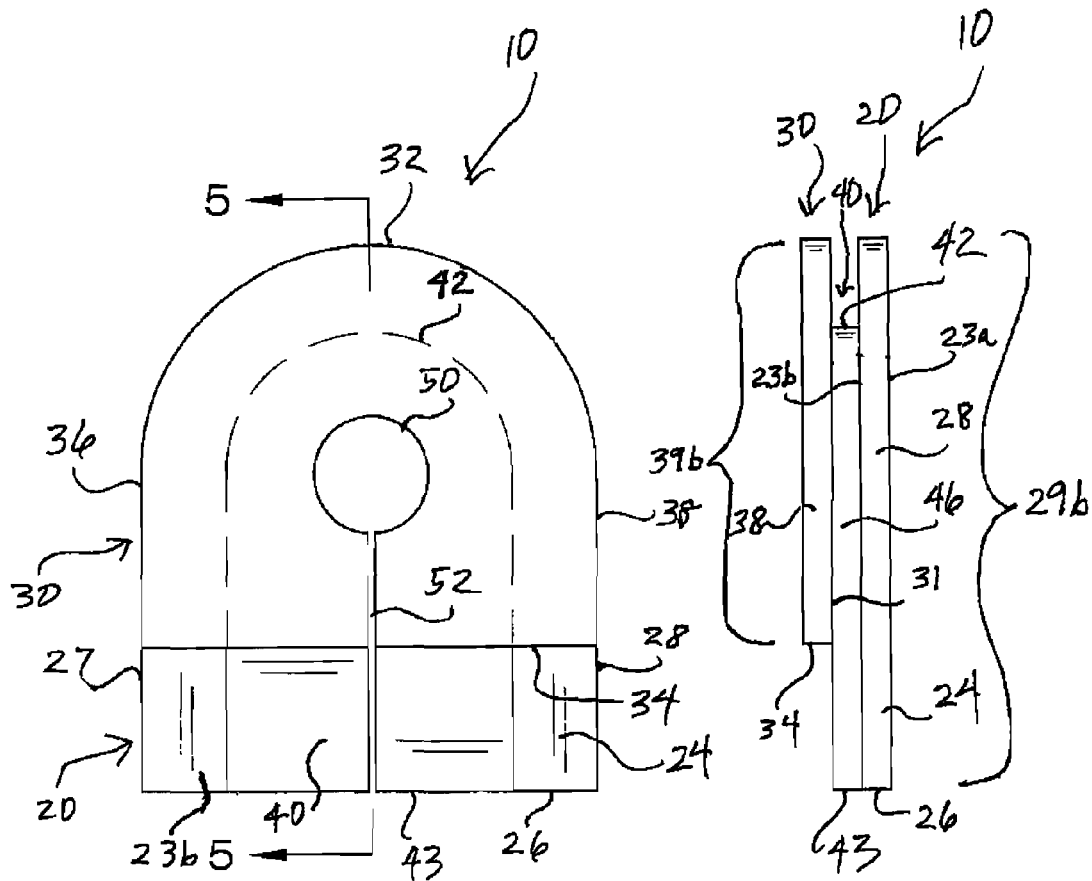
FIG. 2 is a rear elevation view.
FIG. 3 is a second side elevation view.
Figure 5:
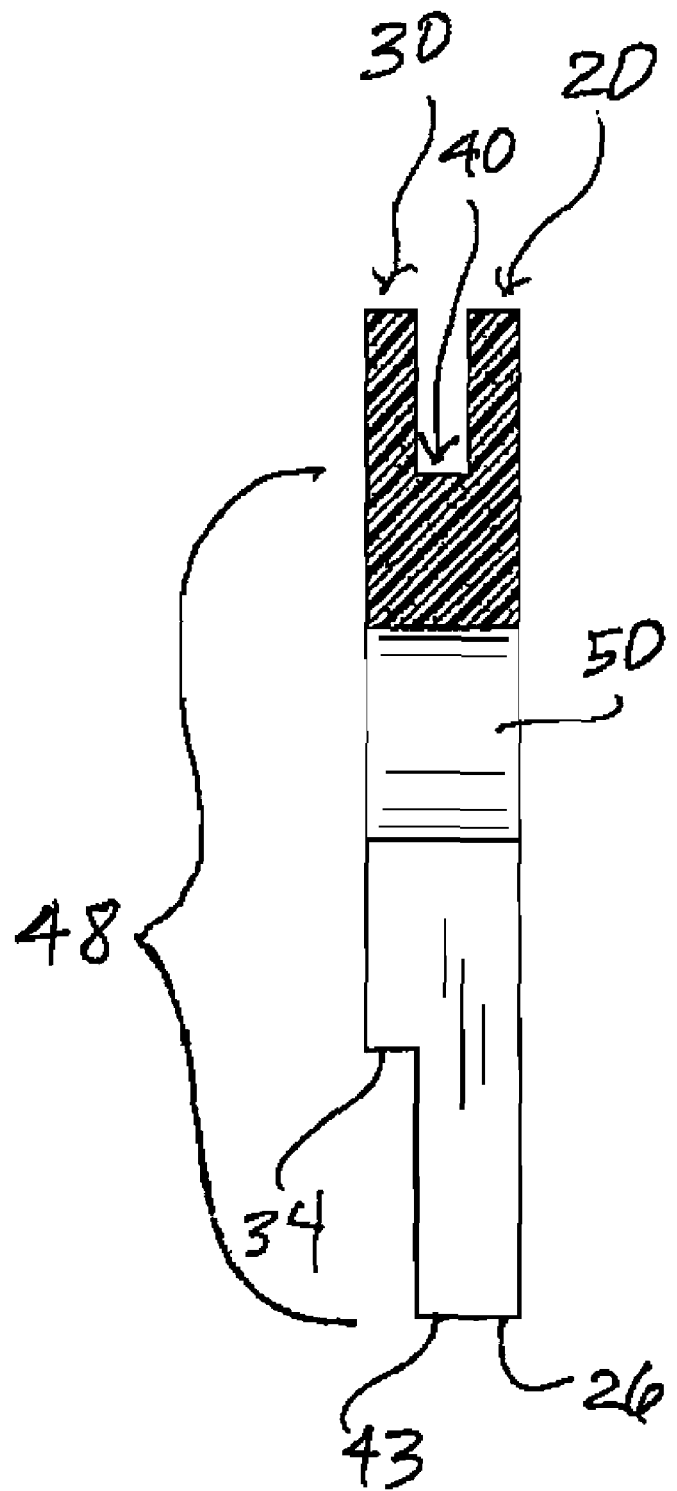
FIG. 5 is a cross sectional view of FIG. 2, taken along the line 5-5.

Referring to FIGS. 2, 3, and 5, the apparatus 10 further comprises the first segment 20 having a first upper arch 22 spaced apart from a first flat bottom 26 of the lower extension 24 of the first segment 20. The first vertical side 27 is spaced apart from the second vertical side 28. The first segment first surface 23*a* is spaced apart from the first segment second surface 23*b*. The first segment 20 has a first segment width 29*a* and a first segment height 29*b*. The union 40 is affixed to the first segment second surface 23*b*. The union 40 has a union arch 42 spaced apart from the union flat bottom 43. The union flat bottom 43 is coplanar with the first flat bottom 26 of the first segment 20. The union first side 44 is spaced apart from the union second side 46. The union width 47 is less than the first segment width 29*a*. The union height 48 is less than the first segment height 29*b*. The union 40 fits snugly within an opening in the exterior wall 84 of the junction box 80. The second segment 30 has a second upper arch 32 spaced apart from the second flat bottom 34. The second segment first side 36 is spaced apart from the second segment second side 38. The second segment first surface 31 is affixed to the union 40. The second segment width 39a is equal to the first segment width 29a. The second segment height 39b is less than the first segment height 29b. The second upper arch 32 and second segment sides are coplanar with the first upper 22 arch and the first segment vertical sides. The slot 52 extends from the orifice 50 to the first flat bottom 26 of the first segment 20, the union flat bottom 43, and the second flat bottom 34 of the second segment 30.

Referring again to FIGS. 1, 4, and 6, the union 40 fits coplanarly within the junction box 80 exterior wall 84 opening. The first segment 20 fits and seals against the interior of the wall 84. The lower extension 24 extends downwardly on the box 80 past a point on the box 80 interior which is equal in depth to the frame 82 on the exterior of the box 80. The lower extension 24 thereby assists in completely sealing against the box 80 interior. The second segment 30 abuts the frame 82 of the box 80 exterior, also providing a seal against the box exterior wall 84 and the frame 82. The orifice 50 seals the tube 90. The slot 52 collapses against itself when the apparatus 10 is installed, thereby completing the seal of the tube 90 and the box 80. The slot 52 provides further benefit in that the tube 90 can be easily selectively installed into the apparatus 10 prior to fitting into the junction box 80.

With respect to the above description then, it is to be realized that the optimum dimensional relationships for the parts of the flange apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the flange apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the flange apparatus may be used.

Therefore, the foregoing is considered as illustrative only of the principles of the flange apparatus. Further, since numerous modifications and changes will readily occur to those skilled in the art, it is not desired to limit the flange apparatus to the exact construction and operation shown and described, and accordingly, all suitable modifications and equivalents may be resorted to, falling within the scope of the flange apparatus.

What is claimed is:

1. A flange apparatus selectively fitted to an opening of a junction box of a trailer, motor home or the like, the apparatus comprising:
   a first segment having a first upper arch spaced apart from a first flat bottom of a lower extension, a first vertical side spaced apart from a second vertical side, a first segment first surface disposed on the second vertical side, the first segment first surface spaced apart from a first segment second surface, a first segment width, and a first segment height, a part of the first segment width and the first segment height abutted against an interior of an exterior wall of the junction box;
   a union affixed to the first segment second surface, the union having a union arch spaced apart from a union flat bottom, the union bottom coplanar with the first flat bottom of the first segment, a union first side spaced apart from a union second side, a union width less than the first segment width, the union snugly fitted within the opening of the junction box;
   a second segment having a second segment arch spaced apart from a second flat bottom, a second segment first side spaced apart from a second segment second side, a second segment first surface affixed to the union, a second segment width equal to the first segment width, a second segment height less than the first segment height, the second upper arch and second segment sides coplanar with the first upper arch and first segment vertical sides, a part of the second segment width and height abutted against an exterior of the exterior wall of the junction box;
   an orifice through about a center of the first segment, the union, and the second segment, the orifice in selective receipt of an appliance tube of the trailer or motor home, the orifice completely surrounding and sealing around the tube;
   a slot extended from the orifice to the first flat bottom of the first segment, the union flat bottom, and the second flat bottom of the second segment.

* * * * *